United States Patent [19]
Johnson et al.

[11] Patent Number: 5,349,662
[45] Date of Patent: Sep. 20, 1994

[54] METHOD OF AND APPARATUS FOR PROVIDING AUTOMATIC DETECTION OF USER ACTIVITY

[75] Inventors: William J. Johnson, Flower Mound; Robert S. Keller, Grapevine; George C. Manthuruthil, Coppell; Marvin L. Williams, Lewisville, all of Tex.

[73] Assignee: International Business Machines Corporation, Roanoke, Tex.

[21] Appl. No.: 886,728

[22] Filed: May 21, 1992

[51] Int. Cl.$^5$ .............................................. G06F 11/30
[52] U.S. Cl. .............................. 395/700; 364/DIG. 1; 364/259.2; 364/267
[58] Field of Search ................... 364/DIG. 1; 395/700

[56] References Cited
PUBLICATIONS

International Business Machines Corporation CP Command and Utility Reference, Release 1 IBM No. SC24-5519-00, published Mar. 1991 at Endicott, N.Y.

M. G. Sobelle A Practical Guide to Unix System V, Second Edition published 1991 at Redwood City, Calif.
K. Christian, and S. Richter The Xenix Command Reference Guide published 1989 at New York, N.Y.
P. E. Bourne Unix for VMS Users published 1990 in the United States of America.

Primary Examiner—Thomas Heckler
Attorney, Agent, or Firm—Prentiss Johnson; Geoff Mantooth

[57] ABSTRACT

Automatic detection of the activities of a user of a data processing system is provided by the use of an Activity Event Detection Process, an Activity Detection Process, and an Interrogator Process. The Activity Event Detection Process detects events indicating user activity. The Activity Detection Process evaluates the user activity indicating events to determine the activity of a user. The Interrogator Process provides an interface to a requesting user and formulates appropriate queries to be sent to one or more Activity Detection Processes.

12 Claims, 6 Drawing Sheets

METHOD OF AND APPARATUS FOR PROVIDING AUTOMATIC DETECTION OF USER ACTIVITY

TECHNICAL FIELD OF THE INVENTION

This invention relates in general to data processing systems, and in particular to a method of, and apparatus for, providing automatic detection of the activities of a user of a data processing system.

BACKGROUND OF THE INVENTION

Conventional data processing systems may provide commands for inquiring about the status of a user of the data processing system. The types of status information typically provided may include which users are logged on to a system, when a user logged on, which workstation the user is logged onto, which programs are being executed by a user, and how long such programs have been executing. However, when a first user desires to inquire about the activity of a second user, no capability is provided by conventional systems. If one desires to ask what is a user doing now, or what did a user do in the past hour, or what did a user do today, or what did a user do last week, then conventional systems cannot answer. This is a problem when the first user desires to initiate an action which either requires, depends upon, or would be furthered by knowledge of the activity of the second user.

The state of the prior art is demonstrated by the IBM (International Business Machines Corporation) VM* Operating System QUERY USERS, QUERY NAMES, and QUERY USERID commands, the DEC (Digital Equipment Corporation) VMS* Operating System SHOW USER and SHOW PROCESS command, and the USL (Unix System Laboratories) UNIX* System V Operating System USERS, WHO, WHODO, RWHO, FINGER, and PS commands. (IBM and VM are registered trademarks of International Business Machines Corporation; DEC and VMS are registered trademarks of Digital Equipment Corporation; USL and UNIX are trademarks of Unix System Laboratories in the United States of America and other countries).

The IBM VM* Operating System QUERY USERS command gives the number of users logged on to the system. The QUERY NAMES command lists the userids of all logged on users. The QUERY USERID command tells if a specific user is logged on to the system. Although these commands tell whether a user is logged on to a system, they do not provide any information on the activity of a user. This is due to the fact that a user may be logged onto a system, but still not be actively using the system. Even if the user is actively using the system, these commands do not provide any information on such activity. In addition, these commands do not provide any information about users relative to remote systems in a network. These commands also do not provide any information about the user relative to a terminal device if such terminal device is an intelligent terminal executing its own operating system and applications in addition to being logged on to the system. In addition, these commands only provide a query for a single user or for all users on a system. These commands do not provide a query for a group of users sharing a common characteristic.

The DEC VMS* Operating System SHOW USER command provides a list of the users currently logged on to the system and their terminal device numbers. The SHOW PROCESS command provides an overview of a VMS user's process including process identification number, process name, process priority, user identification, and default file specification. Again, these commands do not provide any information on the activity of a user; nor do they provide any information about users relative to remote systems in a network; nor do they provide a query for a group of users sharing a common characteristic.

The USL UNIX* System V Operating System USERS command provides a list of the users currently logged on to the system. The WHO command provides the names of the users currently logged on to the system, their terminal device numbers, the times they logged on, and the duration of time that their terminal devices have been inactive. The RWHO command and the FINGER command provide the same information as the WHO command on remote users on other systems in a network, and in addition identify the remote system on which a user is logged on. The PS command provides for each program process that a user is executing at the time of the inquiry, the name of the program process, the terminal device on which the program process is executing, its process ID number, and the amount of CPU (central processing unit) seconds consumed so far by the process. The WHODO command provides for each logged on user, or for a single named user, their terminal device numbers and how long they have been logged on. In addition, WHODO provides for each program process that a user is executing at the time of the inquiry, the same information provided by the PS command. Again, although these commands tell whether a user is logged on to a system, this does not provide any information on the activity of a user. Also, although these commands do provide information about users relative to remote systems in a network, this information is limited to remote systems which are also executing a UNIX operating system. In addition, these commands do not provide a query for a group of users sharing a common characteristic. Although the PS and WHODO commands identify programs that are executing at the instant of inquiry, they do not identify user activity at the instant of inquiry. A program may be executing independent of any user activity. A program may also be executing as a result of a long past user activity. Even though a program may require user activity for its execution, the fact that the program is executing does not identify the user activity or the duration of the user activity. Events in the execution of a program which do indicate user activity are not detected by these commands. Another problem is that the time intervals provided by these commands are measured in CPU seconds, not actual elapsed time. A further problem is that these commands only provide information available at the time of inquiry, they do not provide any historical information.

For a situation which may call for a user needing to know about the activity of another user, consider the following situations.

A user may wish to send an electronic mail distribution to recipients and determine if they are working on the item sent. It may be useful to determine if the recipient actually looked at a distribution whether it be a facsimile image, note, video, etc. The user may also wish to determine what the recipients did with the distribution.

A user may wish detailed status of what an individual, or group of individuals, did with a variety of media or tasks on the system.

A user may wish to receive notification or status of a user activity without a phone call or visit.

A user, such as a manager or a system administrator, may wish to determine which application programs, or portions of application programs, are being used by a user or a group of users. The user may desire detailed history of such usage. The user may also wish to determine device usage. The user may need this information to determine over-utilization or under-utilization of resources for procurement decisions. The user may need this information to determine compliance with license or use restrictions on such resources.

A manager or supervisor may wish to monitor individual or group activity without the individuals being aware of it, or without observing directly with individual senses.

A manager may want to know what activities are being performed by individuals, how much time is required for such activities, and the distribution of such activities. Such information would be useful for work load priority, scheduling, and balancing.

The prior art approaches described above fail to meet the needs of the above situations and present the user with three difficulties. The first difficulty is that the prior art approaches detect if a user is logged on to a system and those programs presently executing. They do not detect the activity of a user. The second difficulty is that the prior art approaches do not generally detect those events in a system which indicate user activity. Even if the prior art approaches coincidentally detect an event indicating user activity, they do not translate the occurrence of such an event into the corresponding user activity. The third difficulty is that the prior art approaches only provide information available at the instant of inquiry, they do not provide either historical information or the capability of a monitored time interval.

Thus the prior art provides no method of, or apparatus for, automatic detection of user activity. As such, there is a need for a method of, and apparatus for, providing automatic detection of activity of a user of a data processing system.

SUMMARY OF THE INVENTION

The invention disclosed herein comprises a method of, and apparatus for, providing automatic detection of activity of a user of a data processing system. The method and apparatus described herein substantially eliminate or reduce the difficulties of attempting to determine activity of a user of a data processing system by providing automatic detection of activity of a user of a data processing system.

In accordance with one aspect of the present invention, automatic detection of activity of a user of a data processing system is provided.

Another aspect of this invention is automatic detection of activity of a user of a remote data processing system different from the requesting user's data processing system.

Yet another aspect of this invention is automatic detection of activity of a user of a remote data processing system executing a different operating system from that of the requesting user's data processing system.

Yet another aspect of this invention is automatic detection of activity of a user provided by the use of a User Activity Event Table. The User Activity Event Table comprises a list of events which may occur in a system and which indicate the activity of a user of the system. The events may be described or represented by parameters, including, but not limited to, interrupt levels, interrupt priorities, semaphore content, or interprocess communication content. The parameters are sufficient to discriminate user activity indicating events from events which do not indicate the activity of a user.

Yet another aspect of this invention is automatic detection of activity of a user provided by monitoring interprocess communications from device drivers in a data processing system and by recognizing user activity indicating events.

Yet another aspect of this invention is automatic detection of activity of a user provided by logging user activity indicating events in an Activity Detection Database whose entries include a description of the user activity indicating events and a time of occurrence of the user activity indicating events.

Yet another aspect of this invention is automatic detection of activity of a user provided by an Activity Translation Table that contains sequences of user activity indicating events and corresponding activities of a user. The Activity Translation Table is used to translate the sequences of user activity indicating events into the corresponding activities of a user.

Yet another aspect of this invention is automatic detection of activity of a user provided by determining activity of a user over a specified time interval.

Yet another aspect of this invention is that queries may be of the form of a single user query, a multiple user query, a group query, or a physical area query.

Yet another aspect of this invention is that the appropriate parameters for formulating each user query that comprise either a single user query, a multiple user query, a group query, or a physical area query are extracted from a user directory.

Yet another aspect of this invention is providing the establishment of an appropriate network connection to and communications with an appropriate Activity Detection Process whether such Activity Detection Process resides on the same data processing system or resides on another system in a network.

Yet another aspect of this invention is automatic detection of activity of a user is provided by direct monitoring of a device driver.

The present invention has the advantage of allowing a first user of a data processing system to detect the activity of a second user of the data processing system or a second user of another data processing connected to the same network as the data processing system.

The present invention has the further advantage of allowing a first user to initiate an action that requires, depends upon, or would be furthered by a second user's activity.

The present invention has the still further advantage of allowing a first user to detect the activity of any or all user members of a group sharing a common characteristic.

The present invention has the still further advantage of allowing queries of the form of a single user query, a multiple user query, a group query, or a physical area query.

The present invention has the still further advantage of allowing a first user to detect the activity of one or more users of a data processing system, without the one or more users being aware of the detection of their activity.

BRIEF DESCRIPTION OF THE DRAWINGS

For a more complete understanding of the present invention and the advantages thereof, reference is now made to the Detailed Description in conjunction with the attached Drawings, in which.

DETAILED DESCRIPTION OF THE INVENTION

Figure 1:
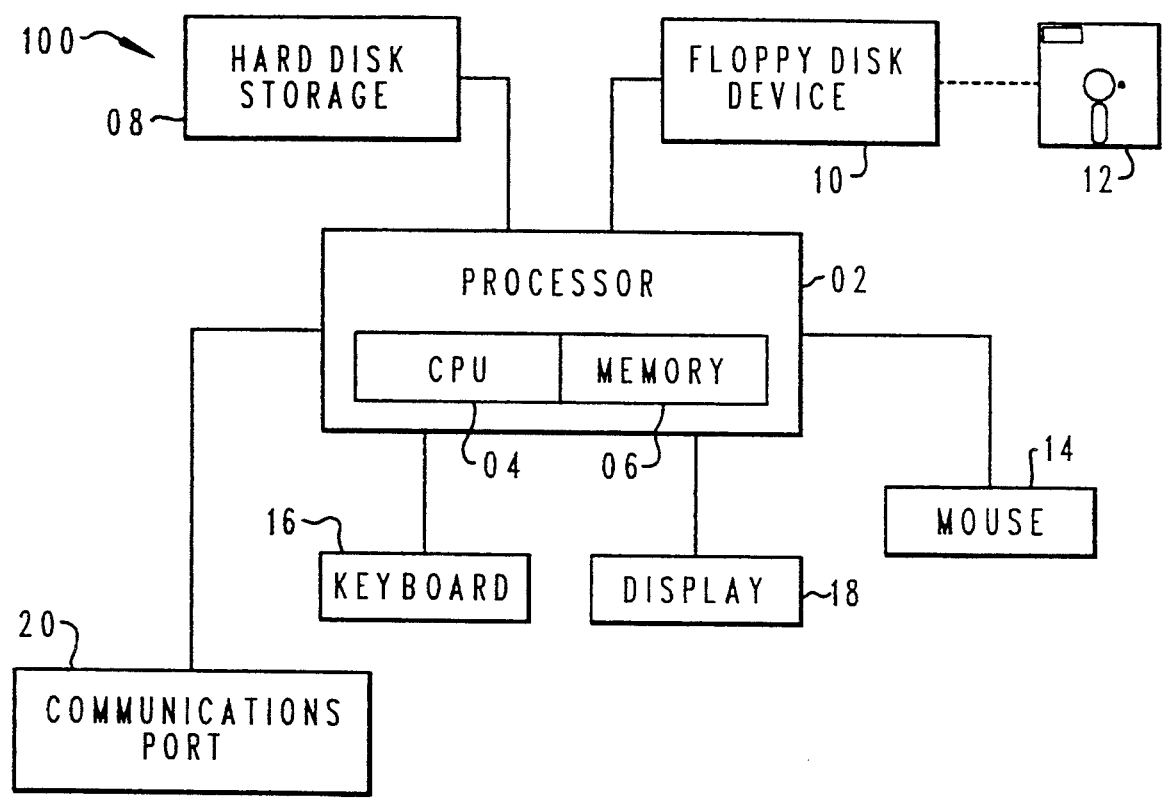
FIG. 1 is a block diagram of a data processing system used in performing the method of the present invention and forming part of the apparatus of the present invention.

Referring first to FIG. 1, there is shown in block diagram form, a data processing system 100 according to the present invention. The data processing system 100 includes a processor 02, which includes a central processing unit (CPU) 04, and a memory 06. Additional memory, in the form of a hard disk file storage 08 and a floppy disk device 10, is connected to the processor 02. Floppy disk device 10 receives a diskette 12 which has computer program code recorded thereon that implements the present invention in the data processing system 100. The data processing system 100 may include user interface hardware, including a mouse 14 and a keyboard 16 for allowing user input to the processor 02 and a display 18 for presenting visual data to the user. The data processing system 100 may also include a communications port 20 for communicating with a network or other data processing systems.

Referring next to FIG. 2 through FIG. 5, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

The operations preferred in carrying out the present invention are implemented as three processes or programs comprising a User Activity Event Detection Process, an Activity Detection Process, and an Interrogator Process. The User Activity Event Detection Process, illustrated in FIG. 2, detects user activity indicating events. The Activity Detection Process, illustrated in FIG. 3 and FIG. 4, evaluates the user activity indicating events to determine the activity of a user. The Interrogator Process, illustrated in FIG. 5, provides an interface to a requesting user and formulates appropriate queries to be sent to one or more Activity Detection Processes.

Figure 2:
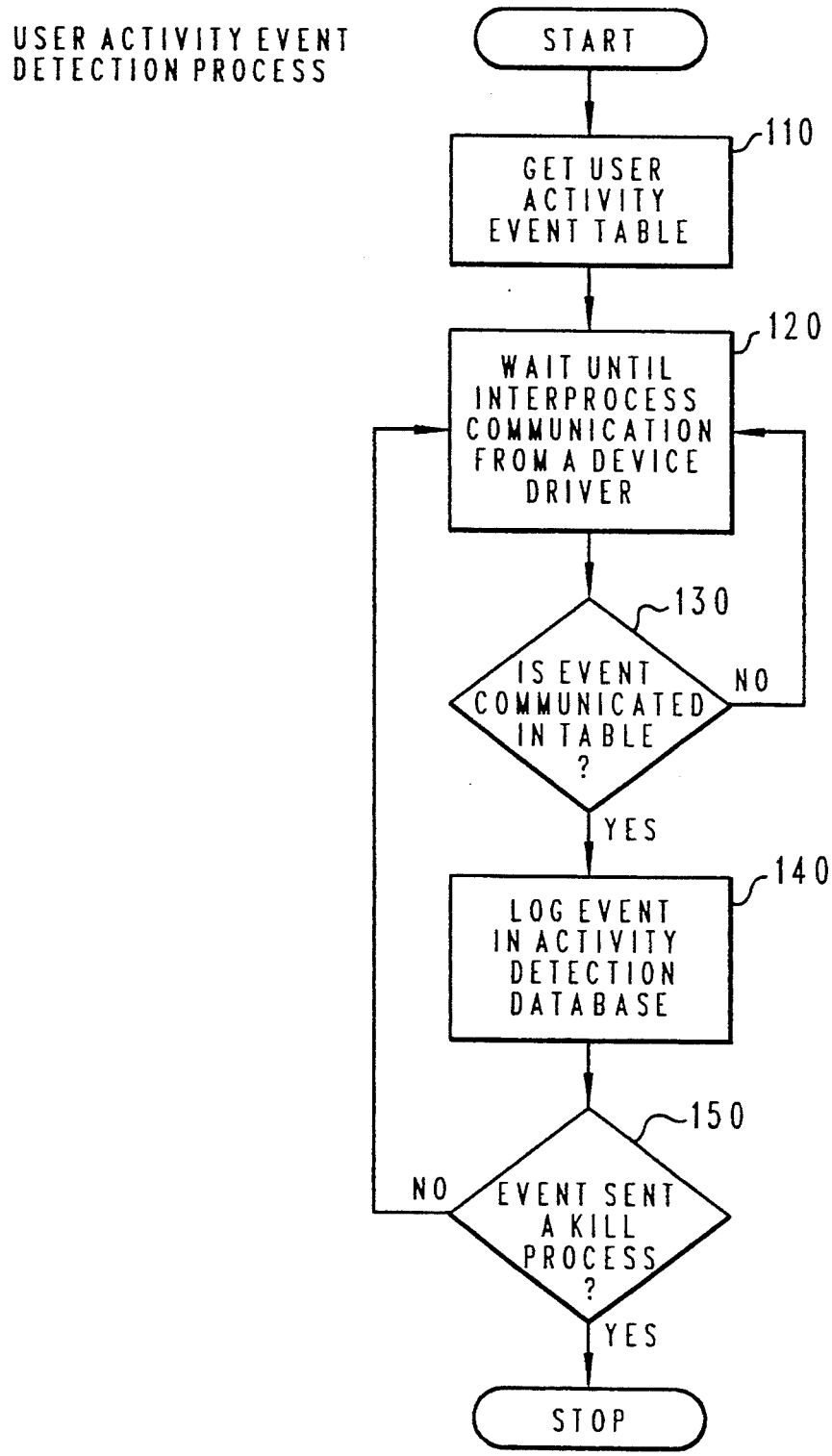
FIG. 2 is a flow chart illustrating the operations preferred in carrying out the user activity event detection process portion of the present invention.

As shown in FIG. 2, which illustrates the operations preferred in carrying out the User Activity Event Detection Process portion of the present invention, after the start of the program, process block 110 accesses a User Activity Event Table. The User Activity Event Table comprises a list of events which may occur in a system and which may indicate an activity of a user. These events may occur in a data processing system, in devices attached to a data processing system, in device drivers servicing such devices, or in programs other than such device drivers. These devices may include input/output devices such as keyboards, mouse, light pens, touch screens, track balls, displays, telephones, printers, scanners, multimedia input/output devices, and other devices which may require the activity of a user for their operation. These devices may also include sensors such as infrared detectors, visible light detectors, radio frequency detectors, electrostatic detectors, magnetic detectors, other electromagnetic detectors, and other sensors which may detect the activity of a user. The events may be described or represented by parameters, including, but not limited to, interrupt levels, interrupt priorities, semaphore content, or interprocess communication content. The parameters are sufficient to discriminate a user activity indicating event from events which do not indicate the activity of a user. For example, the User Activity Event Table may include a description of an event such as a telephone line off-hook signal, indicating that the user has answered his phone. The User Activity Event Table may also include a description of an event such as the opening of an electronic mail document, indicating that the user is reading the document. The User Activity Event Table may also include a description of an event such as the invocation of a spreadsheet program, indicating that the user is working on a spreadsheet. However, the User Activity Event Table does not include any events which are not initiated by a user activity, such as the automatic start or termination of programs by the data processing system.

Thereafter, process block 120 monitors interprocess communications and waits until an interprocess communication is sent by a device driver or a non-device driver program in the system. If such an interprocess communication is recognized by process block 120, then decision block 130 is used to determine whether the interprocess communication is a user activity indicating event described in the User Activity Event Table. If the interprocess communication is a user activity indicating event described in the User Activity Event Table, then process block 140 logs the user activity indicating event in an Activity Detection Database. The log entry will include a description of the event and a time stamp recording the time of occurrence of the event. Logged entries over a configurable time interval may be stored for history information, if desired.

Thereafter, decision block 150 determines whether the event is a kill process. If the event is a kill process, then the program stops. If the event is not a kill process, then the program loops back to processing block 120 to await the next interprocess communication.

Returning now to decision block 130, if the interprocess communication is not an event described in the User Activity Event Table, then the program loops back to processing block 120 to await the next interprocess communication.

Figure 3:
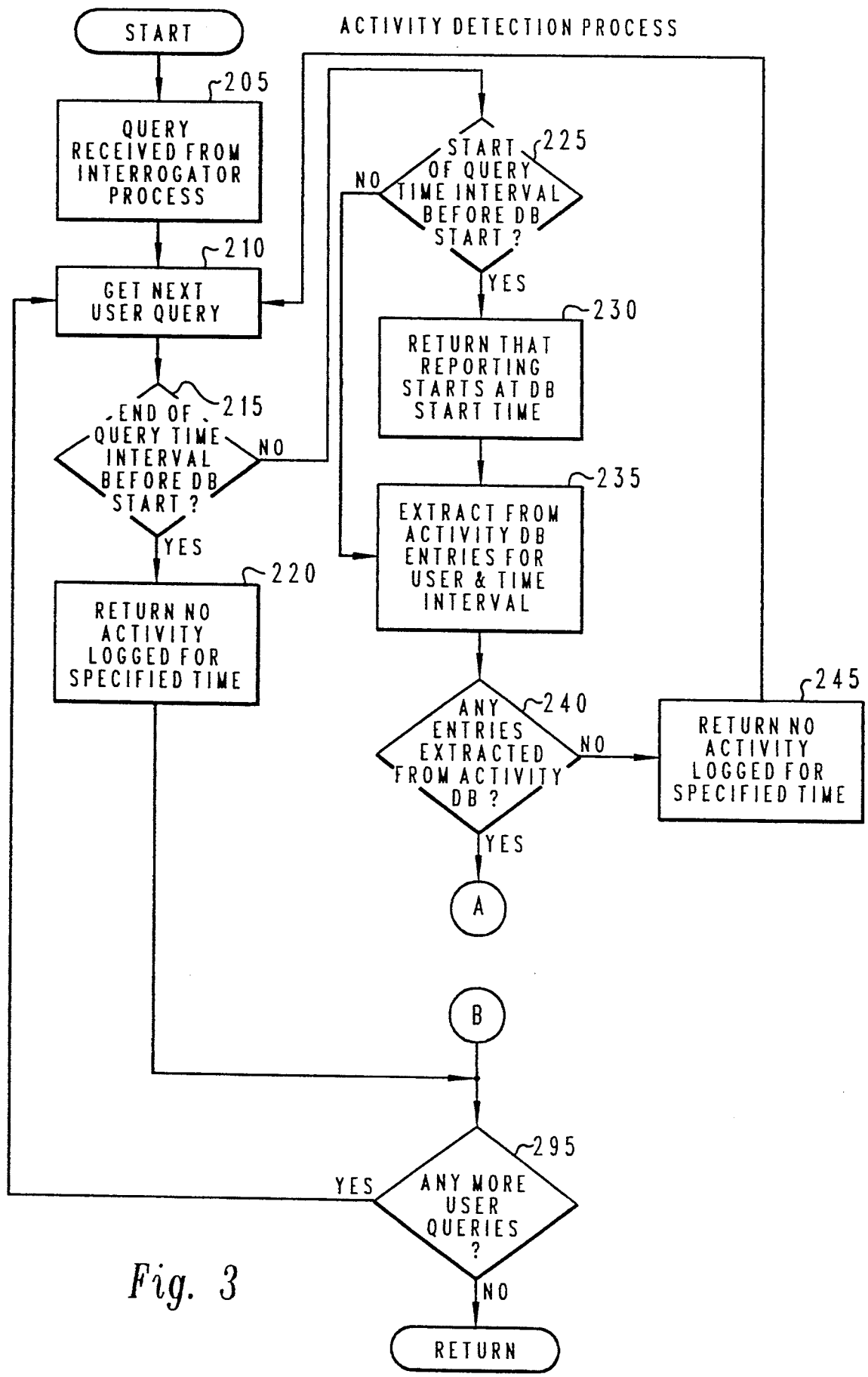
FIG. 3 and FIG. 4 are flow charts illustrating the operations preferred in carrying out the activity detection process portion of the present invention.
Figure 4:
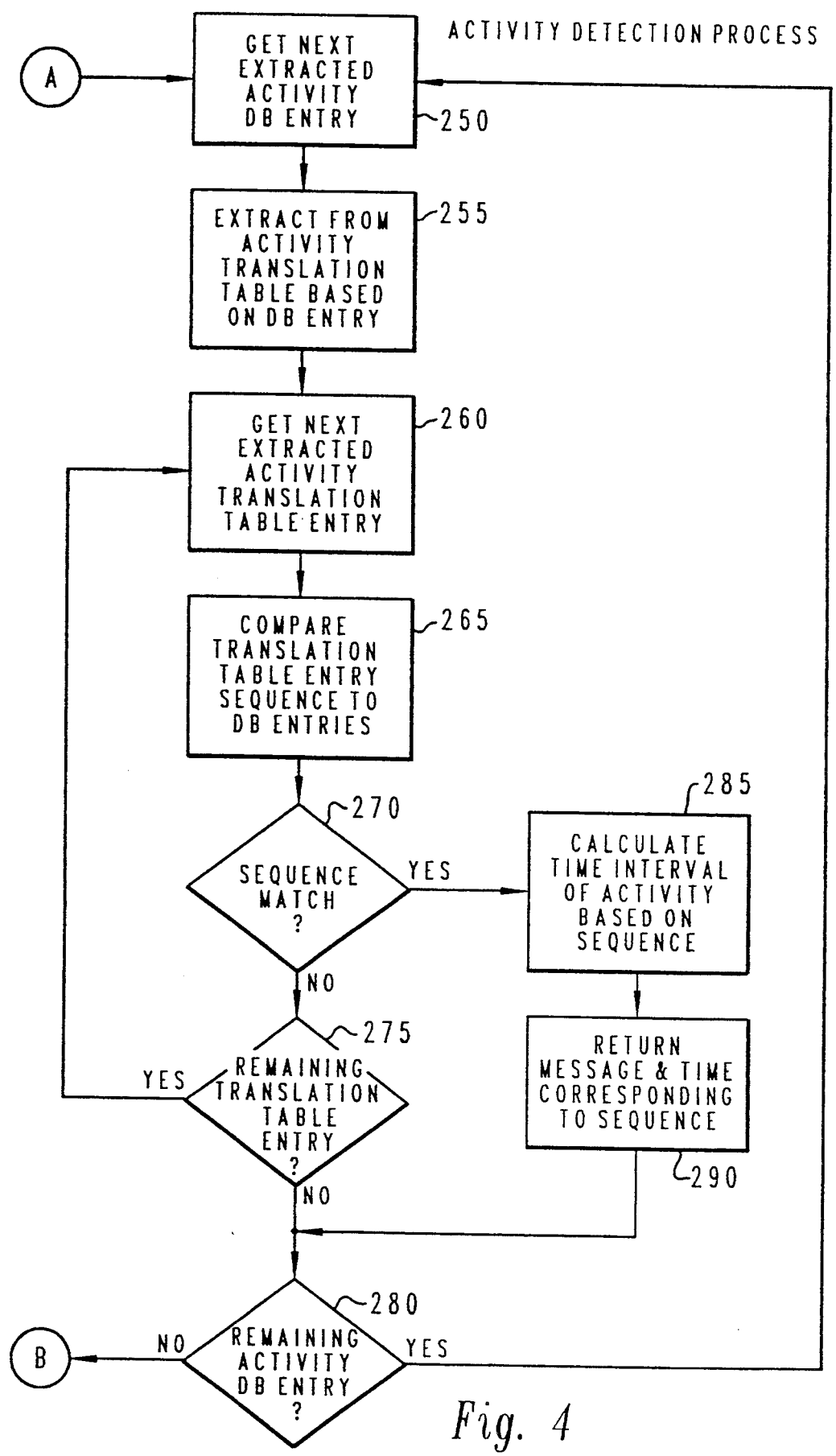
Figure 5:
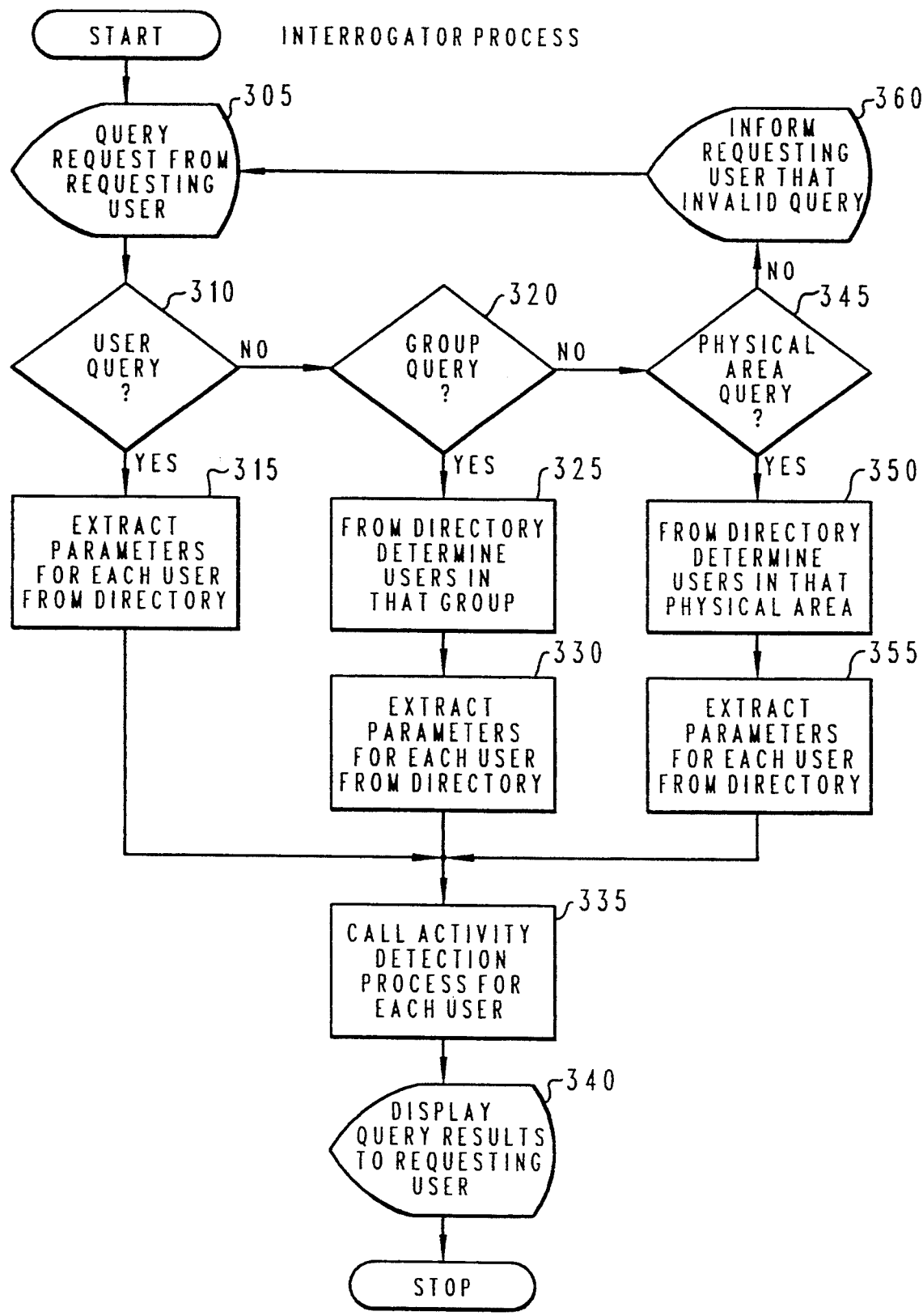
FIG. 5 is a flow chart illustrating the operations preferred in carrying out the interrogator process portion of the present invention.

Referring next to FIG. 3 and FIG. 4, which illustrate the operations preferred in carrying out the Activity Detection Process portion of the present invention, after the start of the program, process block 205 awaits the receipt of a query from the Interrogator Process portion of the present invention. Such a query may comprise one or more user queries. Each such user query inquires about a user's activity over a specified time interval. After receipt of such a query, process block 210 gets the next user query from the query received by process block 205.

Thereafter, decision block 215 determines if the end of the time interval specified in the user query is before the start of the time interval for which the Activity Detection Database has logged user activity indicating events.

If the end of the time interval specified in the user query is not before the start of the time interval for which the Activity Detection Database has logged user activity indicating events, then the Activity Detection Database may contain user activity indicating events for the specified time interval, and decision block 225 determines if the start of the time interval specified in the user query is before the start of the time interval for which the Activity Detection Database has logged user activity indicating events.

If the start of the time interval specified in the user query is before the start of the time interval for which the Activity Detection Database has logged user activity indicating events, then the Activity Detection Database does not contain information on the full specified time interval, and process block 230 returns a message that user activity reporting starts at the time that the Activity Detection Database started logging events.

Thereafter, process block 235 extracts from the Activity Detection Database those user activity indicating events corresponding to the user during the specified time interval.

Thereafter, decision block 240 determines if any user activity indicating events were extracted from the Activity Detection Database.

If any user activity indicating events were extracted from the Activity Detection Database, then, now referring to FIG. 4, process block 250 gets the next user activity indicating event extracted from the Activity Detection Database. On its first execution, process block 250 gets the first extracted user activity indicating event.

Thereafter, process block 255 extracts from a User Activity Translation Table those entries beginning with the user activity indicating event. The User Activity Translation Table comprises multiple entries wherein each entry contains a sequence of user activity indicating events and a corresponding activity of a user. The Activity Translation Table is used to translate the sequences of user activity indicating events into the corresponding activities of a user. For example, a User Activity Translation Table entry may contain a sequence consisting of a telephone off-hook signal, followed by a voice detect signal, followed by a telephone on-hook signal. This entry would contain a corresponding user activity of the user speaking on the telephone for the time interval between the off-hook event and the on-hook event. Another User Activity Translation Table entry may contain a sequence consisting of a telephone off-hook signal followed by a voice detect signal. This entry would contain a corresponding user activity of the user presently speaking on the telephone since the off-hook event. Yet another User Activity Translation Table entry may contain a sequence consisting of a telephone off-hook signal, followed by a carrier detect signal, followed by a telephone on-hook signal. This entry would contain a corresponding user activity of the user communicating via a modem with another data processing system for the time interval between the off-hook event and the on-hook event. Entries in the User Activity Translation Table are arranged by sequence length order, so that longer sequences are compared before shorter sequences.

Thereafter, process block 260 gets the next entry extracted from the User Activity Translation Table. On its first execution, process block 260 gets the first extracted entry.

Thereafter, process block 265 compares the sequence of user activity indicating events in the extracted entry to the user activity indicating events extracted from the Activity Detection Database.

Thereafter, decision block 270 determines if the comparison of process block 265 yields a sequence match in which all events in the extracted entry are contained in the extracted user activity indicating events.

If the comparison of process block 265 yields a sequence match, then a user activity in the extracted entry corresponding to the sequence is recognized. Thereafter, process block 285 calculates a time interval of the recognized user activity by computing a time interval between time stamps of events designated in the sequence. For a recognized user activity still in progress, process block 285 calculates the time interval of the recognized user activity by computing the time interval between the time of inquiry and a time stamp of an event designated in the sequence. Thereafter, process block 290 returns a message describing the recognized user activity, the start time of the recognized user activity based on a time stamp of a first designated event, and the time interval of the recognized user activity calculated by process block 285.

Thereafter, decision block 280 determines if there are any user activity indicating events extracted from the Activity Detection Database remaining to be processed.

If there are not any user activity indicating events extracted from the Activity Detection Database remaining to be processed, then, now referring back to FIG. 3, decision block 295 determines if there are any more user queries to be processed from the query received from the Interrogator Process.

If there are not any more user queries, then the program returns to the Interrogator Process which called the program. Alternatively, the program may stop if it were a separate program process invoked by the Interrogator Process. Alternatively, the program could become dormant awaiting the next query if it is an active process in a multi-process system.

Returning now to decision block 295, if there are any more user queries, then the program loops back to processing block 210 to process the additional user queries as described above.

Returning now to decision block 240, if no user activity indicating events were extracted from the Activity Detection Database, then process block 245 returns a message that no user activity is logged for the specified time interval. Thereafter, the program loops back to processing block 210 to process the additional user queries as described above.

Returning now to decision block 225, if the start of the time interval specified in the user query is not before the start of the time interval for which the Activity Detection Database has logged user activity indicating events, then the Activity Detection Database may contain information on the full specified time interval, and the program proceeds to process block 235 for extraction from the Activity Detection Database those user activity indicating events corresponding to the user during the specified time interval.

Returning now to decision block 215, if the end of the time interval specified in the user query is before the start of the time interval for which the Activity Detection Database has logged user activity indicating events, then the Activity Detection Database does not contain user activity indicating events for the specified time interval, and process block 220 returns a message that no user activity is logged for the specified time interval. Thereafter, the program proceeds to decision block 295 to determine if there are any more user queries to be processed from the query received from the Interrogator Process.

Referring now back to FIG. 4, and returning now to decision block 280, if there are any user activity indicating events extracted from the Activity Detection Database remaining to be processed, then the program loops back to process block 250 to process the next extracted user activity indicating event.

Returning now to decision block 270, if the comparison of process block 265 does not yield a sequence match, then decision block 275 determines if any extracted User Translation Table entries remain to be processed. If no extracted User Translation Table entries remain to be processed, then the program proceeds to decision block 280 to determine if there are any user activity indicating events extracted from the Activity Detection Database remaining to be processed. If extracted User Translation Table entries remain to be processed, then the program loops back to process block 260 to process the next extracted User Translation Table entry.

Referring next to FIG. 5, which illustrates the operations preferred in carrying out the Interrogator Process portion of the present invention, after the start of the program, process block 305 awaits the receipt of a query from a requesting user. The requesting user is that user wishing to detect the activity of a user. The query may be of the form of a single user query, a multiple user query, a group query, or a physical area query. For example, the query may ask what is John Doe doing, or what is John Doe's department doing, or what are the individuals in John Doe's building doing.

Thereafter, decision block 310 determines if the query is a user query.

If the query is a user query, then processing block 315 extracts appropriate parameters for each user in the query from a user directory. These parameters may include the systems on which the user is authorized, the user's system ID(s), the location of such systems, the network paths to such systems, the terminals or workstations the user uses to access such systems, and the Activity Detection Processes for such systems.

Thereafter, processing block 335 calls appropriate Activity Detection Processes, passing appropriate parameters, for each user specified in the query. If the Activity Detection Process resides on another system in a network, then processing block 335 also establishes appropriate network connection and handles the communication of the query to the other system and the receipt of the return status from the other system.

Thereafter, processing block 340 provides to the requesting user the return status and other results of the query as returned from the Activity Detection Process. Embodiments of the return status and other results include status strings or status codes which may be mapped to local user friendly interfaces. Thereafter, the program stops. Alternatively, the program may return to another process which called the program. Alternatively, the program may become dormant awaiting the next query if it is an active process in a multi-process system.

Returning now to decision block 310, if the query ms not a user query, then decision block 320 determines if the query is a group query. A group is a collection of users who share a common characteristic. This common characteristic may be the same department, the same surname, the same job title, using the same device, executing the same process or application, etc.

If the query is a group query, then processing block 325 accesses the user directory and determines which users are contained in the group. Thereafter, processing blocked 330 extracts appropriate parameters for each user contained in the group from the user directory. These parameters may include the systems on which the users are authorized, the users' system ID(s), the location of such systems, the network paths to such systems, the terminals or workstations the users use to access such systems, and the Activity Detection Processes for such systems. Thereafter, the program proceeds to processing block 335 which calls the Activity Detection Process as described above.

Returning now to decision block 320, if the query is not a group query, then decision block 345 determines if the query is a physical area query. A physical area query requests activity detection on all users who reside in that physical area. This physical area may be the same office, department area, floor, building, complex, site, etc.

If the query is a physical area query, then processing block 350 accesses the user directory and determines which users are contained in the physical area. Thereafter, processing block 355 extracts appropriate parameters for each user contained in the physical area from the user directory. These parameters may include the systems on which the users are authorized, the users' system ID(s), the location of such systems, the network paths to such systems, the terminals or workstations the users use to access such systems, and the Activity Detection Processes for such systems. Thereafter, the program proceeds to processing block 335 which calls the Activity Detection Process as described above.

Returning now to decision block 345, if the query is not a physical area query, then processing block 360 informs the requesting user that an invalid query has been requested. Thereafter, the program proceeds to processing block 305 to await another query from the requesting user.

Figure 6:
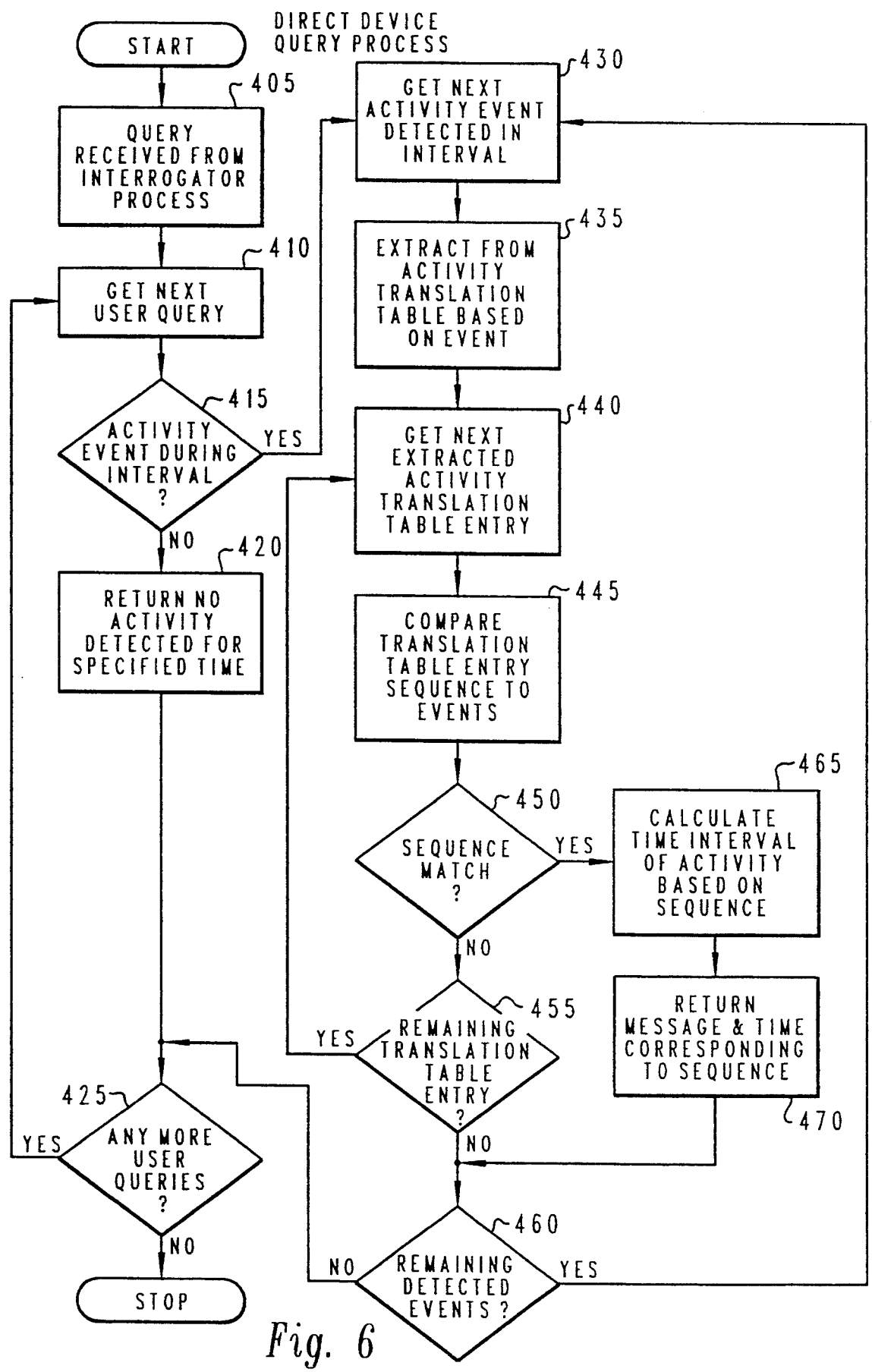
FIG. 6 is a flow chart illustrating the operations used in carrying out an alternative embodiment of the present invention.

Referring now to FIG. 6, a flowchart illustrating operations for an alternative embodiment for carrying out the present invention is shown. This alternative embodiment does not contain either the User Activity Event Detection Process or the Activity Detection Process. In lieu of the User Activity Event Detection Process and the Activity Detection Process, a single Direct Device Query Process is provided. Thus this alternative embodiment comprises a Direct Query Process and an Interrogator Process.

After the start of the program, process block 405 awaits the receipt of a query from the Interrogator Process portion of the present invention. Such a query may comprise one or more user queries.

Thereafter, process block 410 gets the next user query from the query received by process block 405.

Thereafter, decision block 415 determines if a user activity indicating event occurs during a time interval specified in the user query. This specified time interval starts at the time of inquiry.

If a user activity indicating event occurs during the specified time interval, then process block 430 gets the next user activity indicating event detected during the specified time interval. On its first execution, process block 430 gets the first detected user activity indicating event.

Thereafter, process block 435 extracts from a User Activity Translation Table those entries beginning with the user activity indicating event.

Thereafter, process block 440 gets the next entry extracted from the User Activity Translation Table. On its first execution, process block 440 gets the first extracted entry.

Thereafter, process block 445 compares the sequence of user activity indicating events in the extracted entry to the user activity indicating events detected in the specified time interval.

Thereafter, decision block 450 determines if the comparison of process block 445 yields a sequence match in which all user activity indicating events in the extracted entry are contained in the detected user activity indicating events.

If the comparison of process block 445 yields a sequence match, then a user activity in the entry corresponding to the sequence is recognized. Thereafter, process block 465 calculates a time interval of the recognized user activity by computing a time interval between time stamps of events designated in the sequence. For a recognized user activity still in progress, process block 465 calculates the time interval of the recognized user activity by computing the time interval between the time of inquiry and a time stamp of an event designated in the sequence. Thereafter, process block 470 returns a message describing the recognized user activity, the start time of the recognized user activity based on a time stamp of a first designated event, and the time interval of the recognized user activity calculated by process block 465.

Thereafter, decision block 460 determines if there are any detected user activity indicating events remaining to be processed.

If there are not any detected user activity indicating events remaining to be processed, then decision block 425 determines if there are any more user queries to be processed from the query received from the Interrogator Process.

If there are not any more user queries, then the program returns to the Interrogator Process which called the program. Alternatively, the program may stop if it were a separate program process invoked by the Interrogator Process. Alternatively, the program could become dormant awaiting the next query if it is an active process in a multi-process system.

Returning now to decision block 425, if there are any more user queries, then the program loops back to processing block 410 to process the additional user queries as described above.

Returning now to decision block 415, if no user activity indicating events were detected during the specified time interval, then process block 420 returns a message that no user activity is logged for the specified time interval. Thereafter, the program proceeds to processing block 425 to process the additional user queries as described above.

Returning now to decision block 460, if there are any detected user activity indicating events remaining to be processed, then the program loops back to process block 430 to process the next detected user activity indicating event.

Returning now to decision block 450, if the comparison of process block 445 does not yield a sequence match, then decision block 455 determines if any extracted User Translation Table entries remain to be processed. If no extracted User Translation Table entries remain to be processed, then the program proceeds to decision block 460 to determine if there are any detected user activity indicating events remaining to be processed. If extracted User Translation Table entries remain to be processed, then the program loops back to process block 440 to process the next extracted User Translation Table entry.

Although the present invention has been particularly shown and described with reference to a preferred embodiment, it will be understood by those skilled in the art that various changes in form and detail may be made without departing from the spirit and the scope of the invention.

What is claimed is:

1. A method of providing automatic detection of an activity of a user of a data processing system, the data processing system having one or more occurring events that occur on the data processing system, comprising the steps of:
   providing a sequence of user activity indicating events that correspond to a user activity on said data processing system;
   detecting occurrences of the occurring events in the data processing system; and
   evaluating the detected occurring events to determine if the detected occurring events indicate user activity on the data processing system by comparing a sequence of the detected occurring events to said sequence of user indicating activity events.

2. The method of claim 1, wherein the step of evaluating the detected occurring events to determine if the detected occurring events indicate user activity on the data processing system further comprises the step of:
   logging the sequence of the detected occurring events in a database if the sequence of the detected occurring events is the same as said sequence of user activity indicating events.

3. The method of claim 2, wherein the step of evaluating the detected occurring events to determine if the detected occurring events indicate user activity on the data processing system, further comprises the step of:
   evaluating the logged sequence of the detected occurring events over a specified time interval.

4. The method of claim 2, wherein the step of evaluating the detected occurring events to determine if the detected occurring events indicate user activity on the data processing system, further comprises the step of:
   evaluating the logged sequence of the detected occurring events that are produced by a predetermined set of users, a predetermined group of users or from a predetermined physical area containing users.

5. The method of claim 1, wherein said data processing system has interprocess communications that occur thereon, wherein the step of detecting occurrences of the occurring events in the data processing system, further comprises the step of:

monitoring said interprocess communications on the data processing system.

6. The method of claim 1, further comprising the step of:

providing an indication that the user activity has occurred if the sequence of detected occurring events corresponds to said sequence of user activity indicating events.

7. An apparatus for providing automatic detection of an activity of a user of a data processing system, the data processing system having one or more occurring events that occur on the data processing system, comprising:

means for providing a sequence of user activity indicating events that correspond to a user activity on said data processing system;

means for detecting occurrences of the occurring events in the data processing system; and means for evaluating the detected occurring events to determine if the detected occurring events indicate user activity on the data processing system, said means for evaluating comprising means for comparing a sequence of the detected occurring events to said sequence of user activity indicating events.

8. The apparatus of claim 7, wherein the means for evaluating the detected occurring events to determine if the detected occurring events indicate user activity on the data processing system, further comprises:

means for logging the sequence of the detected occurring events in a database if the sequence of the detected occurring events is the same as said sequence of user activity indicating events.

9. The apparatus of claim 8, wherein the means for evaluating the detected occurring events to determine if the detected occurring events indicate user activity on the data processing system, further comprises:

means for evaluating the logged sequence of the detected occurring events over a specified time interval.

10. The apparatus of claim 8, wherein the means for evaluating the detected occurring events to determine if the detected occurring events indicate user activity on the data processing system, further comprises:

means for evaluating the logged sequence of the detected occurring events that are produced by a predetermined set of users, a predetermined group of users or from a predetermined physical area containing users.

11. The apparatus of claim 7, wherein said data processing system has interprocess communications that occur thereon, wherein the means for detecting occurrences of the occurring events in the data processing system, further comprises:

means for monitoring said interprocess communications on the data processing system.

12. The apparatus of claim 7, further comprising:

means for providing an indication that the user activity has occurred if the sequence of detected occurring events corresponds to said sequence of user activity indicating events.

* * * * *